March 5, 1940. V. P. PALMER 2,192,327
REGULATOR
Filed June 27, 1936
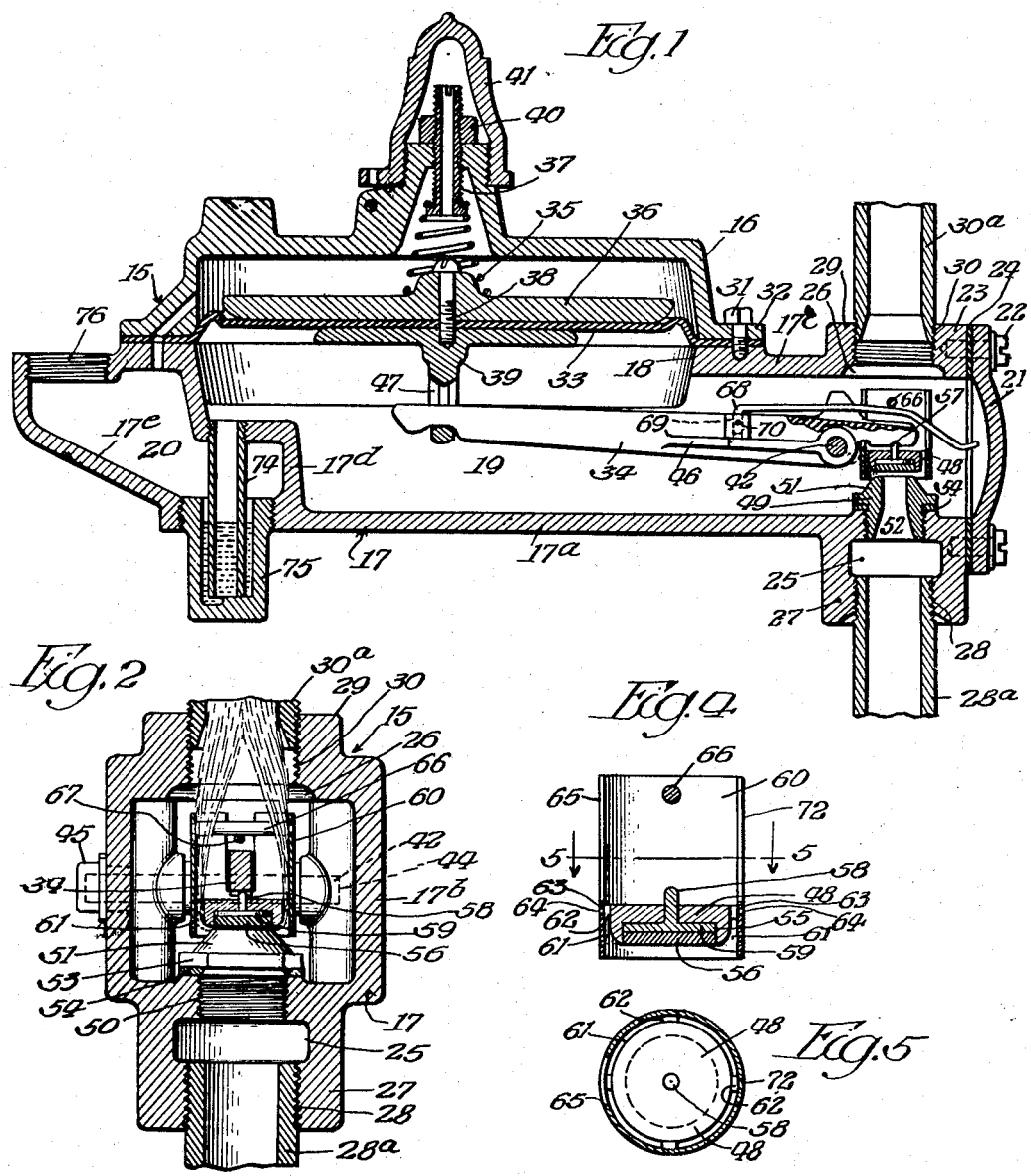
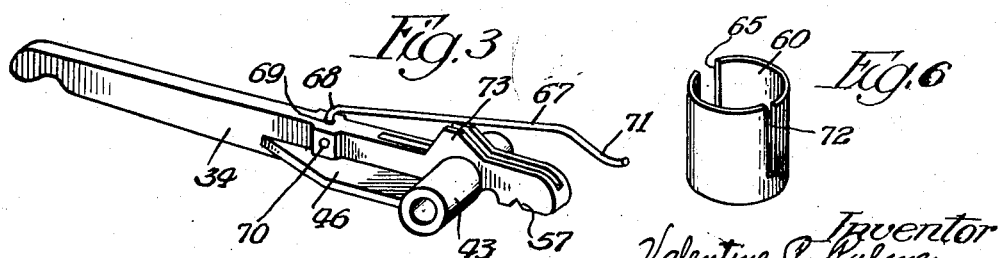
Inventor
Valentine P. Palmer
By Fred Gerlach his Atty Patented Mar. 5, 1940

2,192,327

UNITED STATES PATENT OFFICE 2,192,327

REGULATOR

Valentine P. Palmer, Rockford, Ill., assignor to Garnet W. McKee, Rockford, Ill.

Application June 27, 1936, Serial No. 87,648

5 Claims. (Cl. 50—26)

The present invention relates generally to pressure regulators. More particularly the invention relates to that type of regulator which is designed for use in a system for supplying gas to household or industrial gas burning appliances, serves to maintain substantial uniformity of pressure of the gas in the usual piping between it and the appliances regardless of the rate of flow of the gas, and embodies as the main parts thereof (1) an elongated horizontally extending casing which comprises a lower part having a gas chamber therein and embodying at one of its ends an inlet for the gas and a gas outlet above and in registry with the inlet, and also comprises an upper part over the gas chamber; (2) a diaphragm which is clamped between the upper and lower parts of the casing and is responsive to fluctuations in the pressure of the gas in the chamber; (3) a horizontal lever which extends lengthwise of, and is centrally fulcrumed in, the chamber and is operatively connected at one end thereof to the diaphragm; (4) a valve which is mounted on the other end of the lever for limited universal movement and operates in response to fluctuation or operation of the diaphragm to control the flow of gas flowing through the casing from the inlet to the outlet for pressure regulating or controlling purposes; and (5) means whereby when the valve is open the gas after striking against the bottom face of the valve is caused to flow upwards in a thin tubular stream around the outer face of the valve and then to pass directly into the outlet in such manner as to create adjacent to the inner end of the outlet a jet action which increases in magnitude as the rate of flow of the gas into the outlet increases and thus effects a corresponding diminution or decrease of pressure of the gas under the diaphragm with the result that the regulator is so controlled that the outlet pressure of the gas is either uniform or constant at all times or increases slightly as the rate of flow of the gas from the inlet to the outlet increases.

One object of the invention is to provide a pressure regulator of this type which is an improvement upon, and is more efficient than, previously designed regulators of the same general character and for the same purpose by reason of the fact that the means whereby the gas after striking the bottom face of the valve is caused to flow upwards in a thin tubular stream around the outer or side face of the valve and then to pass directly into the outlet in such manner as to create a jet action adjacent to the inner portion of the outlet in the form of a vertically extending sleeve which extends in spaced relation around the valve and terminates at its upper end adjacent to, but slightly inwardly of, the gas outlet and operates to direct the gas into the outlet in such a concentrated or confined stream that during operation of the burner at full or high capacity there is no likelihood of the outer portion of the stream striking against the outlet forming portion of the casing and deploying outwards under the diaphragm and thus causing either elimination of the jet action and a resultant drop or decrease in the outlet pressure of the gas or such flow of the gas within the casing that the regulator tends to "hunt" or "surge."

Another object of the invention is to provide a pressure regulator of the last mentioned character in which the sleeve for directing or guiding the gas upwards in a concentrated or confined stream into the outlet has a vertical longitudinal slot in its upper end for accommodating the valve carrying end of the lever and operates to confine and direct upwards into the concentrated stream the portion of the gas which impinges or strikes against the bottom face of the lever and tends to flow laterally or outwards under the diaphragm.

A further object of the invention is to provide a pressure regulator of the type and character under consideration which includes a novel arrangement whereby the valve is supported for limited universal movement with respect to the lever and in which the sleeve for directing the gas upwards into the outlet in a concentrated or confined stream is connected to move with the valve.

A still further object of the invention is to provide a pressure regulator which is generally of new and improved construction and may be manufactured at a low and reasonable cost.

Other objects of the invention and the various advantages and characteristics of the present pressure regulator will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a vertical longitudinal section of a pressure regulator embodying the invention;

Figure 2 is an enlarged vertical transverse section on the line 2—2 of Figure 1;

Figure 3 is a perspective view of the lever;

Figure 4 is a vertical sectional view of the valve and sleeve;

Figure 5 is a horizontal section on the line 5—5 of Figure 4; and

Figure 6 is a perspective of the sleeve which surrounds the valve and serves to control the gas so that after impinging or striking against the bottom face of the valve it is caused to flow upwards in a tubular stream around the valve and then into the gas outlet of the regulator casing.

The regulator which is shown in the drawing constitutes the preferred embodiment of the invention and is adapted for use in a system for supplying gas from a gas main (not shown) to different household or industrial gas burning appliances (also not shown). It comprises an elongated, horizontally extending cast metal casing 15 and operates to reduce or cut down the pressure of the gas as it flows from the gas main and to maintain substantial uniformity of pressure of the gas flowing to the different appliances regardless of the rate of flow of the gas. The casing 15 embodies an upper part 16 and a lower part 17. The lower part of the casing comprises a bottom wall 17a, a pair of side walls 17b, a top wall 17c, a cross wall 17d and an end wall 17e. The top wall 17c is provided in the central portion thereof with a circular opening 18. The cross wall is located adjacent to the end wall 17e and with the other walls of the lower part of the casing defines a gas chamber 19 at one side thereof and a relief chamber 20 at its other side. The end of the lower part 17 of the casing that is opposite to the end wall 17e is closed by means of a plate 21 which is removably secured in place by means of bolts 22. The latter, as shown in Figure 1, extend through the margin of the plate and fit within internally threaded holes in a flange 23. A gasket 24 is interposed between the flange and the margin of the plate for sealing purposes. The end of the lower part of the casing which has the plate 21 embodies an inlet 25 for gas and a gas outlet 26. The inlet 25 is in the form of a tubular part 27 which is formed integrally with and depends from the bottom wall 17a and embodies an internal screw thread 28 for connection to a gas delivery pipe 28a. The latter is in the nature of a branch from the gas main and serves to supply gas via the inlet 25 into the regulator casing 15. The outlet 26 is in the form of a tubular part 29 which is formed integrally with and projects upwardly from the top wall 17c of the lower part of the casing. The part 29 is located directly above the inlet forming part 27 and embodies an internal screw thread 30 for connection to a service pipe 30a. The latter includes the usual meter (not shown) and serves to conduct gas from the casing of the regulator to the different gas burning appliances which are supplied with gas by the system in which the regulator is employed. The upper part 16 of the casing is located above the opening 18 in the top wall 17c and is connected removably to the lower part of the casing by means of bolts 31. The latter extend through an outwardly extending flange 32 on the upper part of the casing and fit within integrally threaded holes or sockets in the portion of the top wall 17c of the lower part of the casing that defines the circular opening 18.

In addition to the casing 15, the regulator comprises a circular diaphragm 33 and a substantially horizontal lever 34. The diaphragm extends across the circular opening 18 and has the marginal part thereof clamped between the flange 32 and the subjacent portion of the top wall 17c of the lower part of the casing. The lower face of the diaphragm is exposed to the gas that passes into the chamber 19 through the inlet 25 and hence the diaphragm responds to variations in the pressure of the gas in the chamber. The upper face of the diaphragm is subjected to the action of a spring 35 which extends between a cast metal plate 36 and a hollow adjusting screw 37. The plate 36 fits against the upper face of the diaphragm and is held in place by a screw 38. This screw extends through the center of the diaphragm and is anchored to a plate 39 which fits against the lower face of the diaphragm. The adjusting screw 37 extends through the central portion of the upper part 16 of the casing and is held in place by a lock nut 40. By adjusting the position of the screw 37 the tension of the spring 35 may be varied for regulator setting purposes. A cap 41 is removably secured by a screw thread to the central portion of the upper part 16 of the casing and serves as a closure for and to protect the lock nut 40 and the upper end of the adjusting screw. The lever 34 is disposed in the gas chamber 19 in the lower part of the casing 15. It extends between the gas inlet 25 and the central portion of the plate 39 on the under or bottom side of the diaphragm 33 and is of materially less thickness than height, as shown in Figures 2 and 3 of the drawing. A pin 42 serves as a fulcrum for the lever. This pin extends through a horizontally extending cylindrical bearing member 43 on the central portion of the lever and the ends thereof fit within oppositely facing sockets 44 in the side walls 17b of the lower part of the casing. One of the sockets 44 is open at its outer end so that the pin may be removed from the casing during installation or removal of the lever with respect to the casing. A cap-type plug 45 fits in the socket with the open outer end and serves when screwed into place to hold the pin against axial displacement. The cylindrical bearing member 43 is formed as an integral part of the lever 34. It projects outwardly from the sides of the lever and is located a small distance inwardly from the end of the lever that is adjacent to the gas inlet 25. A pair of horizontally extending ribs 46 project outwardly from the sides of, and serve to reinforce, the lever, as well as to guide the latter into place when it is inserted into the chamber through the plate closed opening during regulator assembly. The end of the lever that is disposed adjacent to the plate 39 is operatively connected to the diaphragm 33 by means of a stirrup 47. The latter is connected to, and extends downwardly from the central part of the plate 39 and operates to swing the lever vertically in response to movement of the diaphragm. The end of the lever that is remotely positioned with respect to the plate 39 and carries the cylindrical bearing member 43, supports a valve 48. This valve coacts with a valve seat 49 and is adapted in response to swinging of the lever 34 by the diaphragm to control the flow of gas through the casing to the outlet 26. When the pressure of the gas in the chamber 19 increases beyond a certain point the diaphragm 33 is forced upwardly. This upward movement of the diaphragm is in turn imparted to the lever 34 and serves to shift the valve into its closed position in order to cut off or reduce the inflow of gas and thus maintain uniformity of pressure as far as the gas passing through the outlet 26 is concerned. When the pressure in the gas chamber 19 decreases, the diaphragm 33 moves downwardly and causes the lever 34 to swing so as to shift the valve 48 into its open position. Opening of the valve results in a greater flow of gas to the casing outlet 26 and stabilization or uniformity of pressure. The valve seat 49 is located directly above the gas inlet 25 and is secured to the bottom wall 17a of the lower part of the casing by a screw thread connection 50. It is provided with a tapered upper part 51 and embodies a central passage 52 through which the gas passes from the inlet 25 to the gas chamber 19. A polygonal flange 53 is formed on the central portion of the valve seat so that the seat may be turned by a wrench or similar turning tool into connected relation with the bottom wall of the casing part 17. A gasket 54 serves to prevent leakage of gas around the valve seat. This gasket is mounted on the central portion of the valve seat and is clamped between the polygonal flange 53 and the subjacent portion of the bottom wall 17a of the lower part of the casing. When it is desired to obtain access to the valve seat the plate 21 is removed by withdrawing the bolts 22 from the flange 23.

The valve 48 is in the form of a vertically extending cylinder. It is positioned between the gas inlet 25 and the outlet 26 and is formed of brass or any other suitable metal. A circular pocket 55 is formed in the bottom face of the valve and a disk 56 of hard leather or any other suitable sealing material is disposed in this pocket as shown in Figure 4 of the drawing. The disk 56 is held in place in the pocket in any suitable manner and is adapted to fit against the tapered part 51 of the valve seat 49 in order to close the central passage 52 and cut off the flow of gas from the inlet 25. The end of the lever 34 that supports or carries the valve 48 overlies and is spaced a small distance from the valve and has a notch 57 in the bottom portion thereof. A stud 58 projects upwardly from the central portion of the valve and fits in the notch 57. The lower end of this stud extends into the circular pocket 55 and embodies a circular head 59. The latter serves as an anchor for the stud and is held in the upper portion of the pocket by means of the disk 56. The upper end of the stud is hemispherical and it together with the notch 57 forms a joint or a connection between the valve and the lever whereby the valve is permitted to move universally to a limited extent relatively to the lever. The stud 58 is preferably of such length that the contiguous portion of the lever is positioned sufficiently far from the top of the valve so that the valve may tilt lengthwise of the lever to the proper extent to seat the disk 56 against the tapered part 52 of the valve seat when the lever is swung by the diaphragm into a valve closing position. The valve 48 is smaller in diameter than the outlet 26 and is coaxially disposed with respect to the outlet and the gas inlet 25. The sealing disk 56 is of such thickness that the bottom face thereof is flush with the bottom face of the valve. The bottom corner of the valve, that is the corner between the bottom and side faces, is rounded or curved so that the gas after striking against the disk upon entering the valve casing, flows upwards around the side wall of the valve in a thin annular stream.

In order to control the flow of gas from the inlet 25 to the gas outlet 26 so as to obtain maximum efficiency and substantially perfect performance of the regulator, a vertically extending sleeve 60 of brass or like metal is provided. This sleeve surrounds, and is concentrically positioned with respect to, the valve 48. It is slightly greater in diameter than the valve and is of uniform width or diameter from one end thereof to the other. The lower end of the sleeve forms an annular vertically extending passageway 61 around the valve and the gas which strikes against the bottom face of the valve, that is the sealing disk 56, and is caused to flow upwards as the result of the rounded corner between the bottom and side faces of the valve, passes upwardly in an annular stream through this passageway. A plurality of pins 62 project radially from the side wall of the valve 48 and serve to maintain or hold the sleeve in concentric relation with the valve. These pins are circular in cross-section. They terminate adjacent to holes 63 in the lower end of the sleeve and are either welded or pressed into place or held in fixed relation with respect to the ring by small pieces 64 of solder in the holes 63. Preferably there are four pins and these are arranged 90° apart. The holes 63 are smaller in diameter than the pins so that the pins abut against the inner periphery of the sleeve and serve effectively to hold the sleeve in concentric relation with the valve. The extreme bottom portion of the sleeve extends below the bottom face of the valve 48 and surrounds the tapered upper part 51 of the valve seat 49. By having the extreme bottom portion of the sleeve surround said tapered part 51 of the valve seat substantially all of the gas which enters the casing via the inlet 25 is directed upwards through the annular passageway 61. The sleeve is approximately four times the height of the valve and is smaller in diameter than the gas outlet 26. The upper end of the sleeve terminates a small distance beneath the outlet and serves or operates to discharge the gas which flows upwardly through the annular passage 61 directly into the gas outlet. By controlling or directing the gas so that it flows upwards in an annular stream into the outlet 26 a jet action is produced in the casing 15. This jet action increases in magnitude as the velocity or rate of flow of the gas through the casing increases and due to the resulting diminution of pressure of the gas under the diaphragm controls the regulator so that the outlet pressure of the gas is either constant or uniform regardless of the rate of flow or increases slightly as the rate of flow of the gas increases. By reason of the fact that the upper end of the sleeve terminates immediately beneath the outlet 26 the gas passing upwards through the sleeve all flows in a concentrated stream into the outlet and there is no likelihood when the rate of flow of the gas increases as a result of the increased demand by the appliances of the system in which the regulator is installed of the gas striking against and being deflected laterally by the outlet defining portion of the casing and thus overcoming the jet action and causing either a diminution in outlet pressure or so-called "hunting" or "surging", that is fluctuation of the outlet pressure. By eliminating "hunting" or "surging" maximum efficiency of the regulator is obtained.

The sleeve 60 which surrounds the valve 48 and causes the gas entering the casing 15 via the inlet 48 to flow upwards in an annular stream into the outlet 26 so as to produce a jet action within the casing, is provided with a vertically extending slot 65 through which the valve carrying end of the lever 34 extends. This slot, as shown in Figure 4, extends from a point directly above the top face of the valve 48 to and through the upper edge of the sleeve. As shown in Figure 2, the slot is but slightly greater in width than the valve carrying end of the lever. Because of this but little, if any, gas escapes from the sleeve via the slot 65 and the gas which impinges against the bottom face of the valve carrying end of the lever and tends to flow laterally is confined within the sleeve so that it is directed upwards into the gas outlet 26. The valve 48 is supported from the lever by means of a horizontally extending rod 66 which extends across the top portion of the sleeve and is mounted in oppositely facing holes 67 in the sleeve. The central portion of the pin overlies the portion of the lever above the stud 58 and rests on the central portion of a strip 67 of spring wire. The spring wire strip extends longitudinally of the lever and is bent downwardly at one end so as to form an anchor piece 68. The latter extends downwardly into a hole 69 in the central portion of the lever 34. A hole 70 is formed in the lever so that it intersects the hole 69 and permits the central portion of the anchor piece 68 to be deflected by way of a punching tool or similar device. The central portion of the spring wire strip 67 bears against the pin 66 and is under such spring tension as the result of the bend which forms the anchor piece 67 that it urges the valve 48 upwardly and holds the stud 58 in the notch 57. As shown in Figure 1 of the drawing there is sufficient clearance between the pin 66 and the top face of the subjacent portion of the lever to permit the valve to be forced downwardly against the force of the spring in order to permit of assembly and removal of the valve 48 with respect to the lever. The free end of the spring wire strip 67 extends downwardly and is provided with an upturned hook part 71. This hook part is adapted to facilitate mounting of the valve on the lever when the lever is in the casing, and extends through a vertically extending slot 72 in the sleeve 60. As shown in Figures 4 and 5 the slot 72 is positioned diametrically opposite the slot 65 and extends from a point adjacent the upper or top face of the valve 48 to the upper edge of the sleeve. In assembling or mounting the valve on the lever the spring wire strip 67 is pressed downwardly either by placing the finger against the hook part 71 or by first moving the hook part downwardly with the pin 66. Thereafter the valve is shifted inwardly and downwardly toward the lever until the stud 58 is brought into registry with the notch 57. When the valve is released the spring wire strip 67 springs or forces the valve upwardly and snaps the stud into place in the notch 57. When it is desired to remove the valve from the lever the plate 21 is first removed and then the valve is moved downwardly against the force of the spring wire strip and pulled away from the lever. The spring wire strip 67 is held against transverse displacement with respect to the lever by means of a pair of laterally spaced webs 73. These webs extend upwardly from and are formed as an integral part of the top face of the lever. They lap the sides of the spring wire strip and are positioned directly above the cylindrical bearing member 43 for the pin 42. During tilting of the valve 48 with respect to the lever in connection with closing of the disk 55 against the tapered part of the valve seat 49 the pin 66 rides on top of the central portion of the spring wire strip 67. The outer or free end of the spring wire strip 67 is preferably of such length that the hook part is readily accessible when the plate 21 is removed from the casing. As shown in the drawing the central portion of the plate 21 is bulged slightly outwardly and the hook part is located in the concavity in the inner face of the plate. By arranging the hook part in this manner it may be readily manipulated during mounting or removal of the valve with respect to the lever.

Assuming that the valve 48 is open, the operation of the regulator is as follows: Gas enters the casing 15 via the central passage 52 in the valve seat 49 and strikes against the bottom face of the disk 56 at the bottom of the valve 48. From this disk the gas flows outwardly until it encounters the lower end of the sleeve 60 and the curved or rounded bottom corner of the valve. From this point the gas, as previously described, flows upwardly in an annular stream within the sleeve and passes into the outlet 26. When the appliances which are supplied with gas by the service pipe 30a are operated at greater capacity and as a result the flow of gas through the service pipe 30a increases the diaphragm 33 in the regulator casing operates because of the resultant decrease in pressure of the gas in the chamber 19 to open the valve 48 so as to permit of an increase in flow of the gas from the branch pipe 28a to the service pipe. This increase in flow or volume of the gas increases its pressure in the service pipe 30a. When the appliances receiving gas from the service pipe 30a are cut down so as to decrease the consumption of gas, pressure builds up in the chamber 19 and causes the diaphragm 33 through the medium of the lever 34 to shift the valve so as to decrease the orifice between the valve and the valve seat and thus reduce the inflow of gas through the casing and stabilize the outlet pressure. Because of the manner in which the gas flows into the outlet 26 and the resultant jet action in the regulator casing the regulator operates to cause a slight increase in outlet pressure of the gas as the rate of flow of gas increases through the service pipe 30a.

In order to permit of the escape of gas in the event that excess pressure is developed in the chamber 19 as the result of foreign particles preventing closing of the valve 48, a relief tube 74 is provided. This tube extends through the cross wall 17d of the lower casing part 17 and is arranged so that one end thereof projects downwardly into a cup 75 which is partially filled with mercury and communicates with the relief chamber 20. When excessive pressure develops in the gas chamber 19 the gas displaces the mercury in the cup and escapes via the relief chamber 20 to a vent opening 76.

The herein described service regulator is not only extremely efficient in operation but may be manufactured at a low and reasonable cost due to the simplicity of the valve assembly. The valve assembly which includes the sleeve 60 is characterized by the fact that it is of unitary character and may be readily removed for cleaning or replacement purposes. By employing the sleeve 60 the gas is controlled, as previously pointed out so that it flows into the outlet 26 in a tubular stream and produces a jet action. Due to the fact that the sleeve is smaller in diameter than the outlet and its upper end terminates but a small distance below the outlet the gas flows upwards into the outlet in a concentrated manner and there is no likelihood of the annular stream due to increased flow of the gas increasing in diameter to a point where the jet action is eliminated. By connecting the sleeve to the valve so that it moves with the latter any dirt or dust particles which may accumulate on the inner face of the sleeve are jarred loose when the valve is closed and thus the sleeve is self-cleaning. In view of the fact that the portion of the lever against which the gas impinges or strikes during upward flow to the outlet 26 is encased or enclosed by the sleeve no gas is permitted to flow laterally under the diaphragm and produce so-called "hunting" or "surging." By employing the sleeve for controlling the flow of gas from the inlet to the outlet the valve 48 may be made comparatively small with a view of reducing the "lock-up" pressure of the regulator.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a pressure regulator comprising a casing having in one portion thereof a diaphragm adapted to fluctuate in response to changes in pressure within the casing, and having in another portion thereof an inlet for gas under pressure and a gas outlet directly oppposite to the inlet, the combination of means forming a valve seat around the inner end of the inlet, a valve for controlling the flow of gas into the casing disposed between the inlet and the outlet and in spaced relation with respect to the interior surfaces of the casing and having a seat engaging face disposed directly opposite to the valve seat and adapted to have the gas strike thereagainst, a sleeve having one end thereof extending in spaced relation around and connected to the valve and its other end terminating adjacent to, but spaced inwardly from, the outlet and provided with a slot, and adapted to cause the gas after striking against the seat engaging face of the valve to flow into the outlet in a concentrated stream and in such manner as to create adjacent to the inner end of the outlet a jet action which increases in magnitude as the rate of flow of gas into the outlet increases and effects a corresponding diminution or decrease of pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having one end thereof extending through the slot in the sleeve and operatively connected to the valve and its other end connected to the diaphragm so that it operates to open the valve when the diaphragm fluctuates in one direction as the result of a decrease in pressure within the casing.

2. In a pressure regulator comprising a casing having in one portion thereof a diaphragm adapted to fluctuate in response to changes in pressure within the casing, and having in another portion thereof an inlet for gas under pressure and an annular gas outlet directly opposite to the inlet, the combination of means forming a valve seat around the inner end of the inlet, a valve for controlling the flow of gas into the casing disposed between the inlet and the outlet and in spaced relation with respect to the interior surfaces of the casing and having a seat engaging face disposed directly opposite to the valve seat and adapted to have the gas strike thereagainst and also having a continuous side face centrally positioned with respect to, and smaller in diameter than, the outlet, a substantially cylindrical sleeve having one end thereof extending in a concentric manner around and spaced from the side wall of the valve and forming an annular passage between it and the valve and having its other end projecting beyond the valve and, terminating adjacent to, but spaced slightly inwardly from, the outlet and provided with a slot, said sleeve being smaller in diameter than the outlet and adapted to cause the gas after striking against the seat engaging face of the valve to flow through the annular passageway and then in a concentrated stream into the outlet in such manner as to create adjacent to the inner end of said outlet a jet action which increases in magnitude as the rate of flow of gas into the outlet increases and effects a corresponding diminution or decrease of pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having one end thereof extending through the slot in the sleeve and operatively connected to the valve and its other end connected to the diaphragm so that it operates to open the valve when the diaphragm fluctuates in one direction as the result of a decrease in pressure within the casing.

3. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing disposed between the inlet and outlet and in spaced relation with respect to the interior surfaces of the casing and having a seat engaging face disposed directly opposite to the valve seat and adapted to have the gas strike thereagainst and also having a substantially continuous side face centrally positioned with respect to the gas outlet, a lever for moving the valve in response to fluctuation of the diaphragm to and from the valve seat in order to regulate or control the pressure of the gas flowing out of the casing via the outlet, centrally fulcrumed in the casing and having one end thereof connected and extending to the valve and its other end connected to the diaphragm so that it operates to open the valve when the diaphragm fluctuates in one direction as the result of a decrease in pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and means for directing or guiding any gas striking against said one end of the lever so that it flows with the rest of the gas directly into the outlet.

4. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing disposed between the inlet and outlet and in spaced relation with respect to the interior surfaces of the casing and having a seat engaging face disposed directly opposite to the valve seat and adapted to have the gas strike thereagainst and also having a substantially continuous side face centrally positioned with respect to the gas outlet, a lever for moving the valve in response to fluctuation of the diaphragm to and from the valve seat in order to regulate or control the pressure of the gas flowing out of the casing via the outlet, centrally fulcrumed in the casing and having one end thereof connected and extending to the valve and its other end connected to the diaphragm so that it operates to open the valve when the diaphragm fluctuates in one direction as the result of a decrease in pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and deflector forming means extending around said one end of the lever for directing or guiding any gas striking against said one end of the lever so that it flows with the rest of the gas directly into the outlet.

5. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing disposed between the inlet and the outlet in spaced relation with respect to the interior surfaces of the casing and having a seat engaging face disposed directly opposite to the valve seat and adapted to have the gas strike thereagainst, a sleeve having one end thereof extending in spaced relation around, and connected to, the valve and its other end terminating adjacent to but spaced inwardly from the outlet and provided with a longitudinal slot, and arranged to cause the gas after striking against the seat engaging face of the valve to flow into the outlet in a concentrated stream and in such manner as to create adjacent to the inner end of the outlet a jet action which increases in magnitude as the rate of flow of gas into the outlet increases and effects a corresponding diminution or decrease of pressure of the gas in the casing, a member extending across said other end of the sleeve, a lever for actuating the valve in response to fluctuation of the diaphragm fulcrumed centrally in the casing and having one end thereof extending through the slot and into the sleeve and its other end operatively connected to the diaphragm, a stud and notch connection between the valve and said one end of the lever operative to permit the valve to move relatively to the lever, and spring means carried by said one end of the lever and applied to the cross member in such manner that the valve is urged toward said one end of the lever and the stud and notch of the aforesaid connection are yielding held in abutting relation.

VALENTINE P. PALMER.